United States Patent [19]
Singh et al.

[11] Patent Number: 6,133,498
[45] Date of Patent: Oct. 17, 2000

[54] METHOD FOR PRODUCING CHEMICALLY BONDED PHOSPHATE CERAMICS AND FOR STABILIZING CONTAMINANTS ENCAPSULATED THEREIN UTILIZING REDUCING AGENTS

[75] Inventors: Dileep Singh, Naperville; Arun S. Wagh, Orland Park; Seung-Young Jeong, Westmont, all of Ill.

[73] Assignee: The United States of America as represented by the United States Department of Energy, Washington, D.C.

[21] Appl. No.: 09/305,820

[22] Filed: May 5, 1999

[51] Int. Cl.$^7$ ............................................. G21F 9/16
[52] U.S. Cl. ........................... 588/3; 588/4; 588/10; 588/252; 264/0.5; 501/111; 501/112; 501/155
[58] Field of Search ........................... 588/246, 3, 4, 588/10, 16, 252, 255; 264/0.5, 333; 501/155, 111, 112; 106/690, 691; 75/746, 773, 962

[56] References Cited

U.S. PATENT DOCUMENTS

| | | | |
|---|---|---|---|
| 5,645,518 | 7/1997 | Wagh et al. | 588/252 |
| 5,830,815 | 11/1998 | Wagh et al. | 501/155 |
| 5,846,894 | 12/1998 | Singh et al. | 501/155 |
| 5,939,039 | 8/1999 | Sapieszko et al. | 423/311 |

OTHER PUBLICATIONS

*Modified Phosphate Ceramics for Stabilization and Solidification of Salt Mixed Wastes*, authored by Dileep Singh, Kartikey Patel, Arun S. Wagh, Seung-Young Jeong, published in the Proceedings of Spectrum '98, International Conference on Decommissioning and Decontamination and on Nuclear and Hazardous Waste Management, Denver, Colorado, Sep. 13–18, 1998.

*Modified Phosphate Ceramics for Stabilization of Salt Mixed Wastes*, thesis authored by Kartikey Patel, submitted for review on or after May 7, 1998 and defended on Jun. 26, 1998.

U.S. Patent Application Ser. No.__/124,822, Continuation–in–part of U.S. Patent Nos. 5,846,894 and 5,830,815.

U.S. Patent Application Serial No.__/617,284, Continuation–in–part of U.S. Patent No. 5,830,815.

PCT Patent Application No. PCT/US97/04132.

*Primary Examiner*—Steven P. Griffin
*Assistant Examiner*—Elin A Warn
*Attorney, Agent, or Firm*—Bradley W. Smith; Mark P. Dvorscak; William R. Moser

[57] ABSTRACT

Known phosphate ceramic formulations are improved and the ability to produce iron-based phosphate ceramic systems is enabled by the addition of an oxidizing or reducing step during the acid-base reactions that form the phosphate ceramic products. The additives allow control of the rate of the acid-base reactions and concomitant heat generation. In an alternate embodiment, waste containing metal anions are stabilized in phosphate ceramic products by the addition of a reducing agent to the phosphate ceramic mixture. The reduced metal ions are more stable and/or reactive with the phosphate ions, resulting in the formation of insoluble metal species within the phosphate ceramic matrix, such that the resulting chemically bonded phosphate ceramic product has greater leach resistance.

33 Claims, 3 Drawing Sheets

Eh–pH diagram of Re–O–H and Tc–O–H systems along experimentally determined values for MKP system.

MICROSTRUCTURE OF IRON PHOSPHATE PRODUCED FROM HAEMATITE

FIG. 1

MICROSTRUCTURE OF IRON PHOSPHATE PRODUCED FROM MAGNETITE

FIG. 2

Eh–pH diagram of Re–O–H and Tc–O–H systems along experimentally determined values for MKP system.

FIG. 3

METHOD FOR PRODUCING CHEMICALLY BONDED PHOSPHATE CERAMICS AND FOR STABILIZING CONTAMINANTS ENCAPSULATED THEREIN UTILIZING REDUCING AGENTS

CONTRACTUAL ORIGIN OF THE INVENTION

The United States Government has rights in this invention pursuant to Contract Number W-31-109-ENG-38 between the United States Department of Energy and The University of Chicago, as operator of Argonne National Laboratory.

TECHNICAL FIELD

This invention relates to the use of chemically bonded phosphate ceramic (CBPC) waste forms for immobilizing large volumes of low-level, radioactive and/or hazardous waste, and, in particular, to an improved process and CBPC product.

BACKGROUND OF INVENTION

Low-level mixed wastes contain hazardous chemical and low-level radioactive materials. Of particular concern are low-level mixed waste streams that contain heavy metals, such as lead, cadmium, copper, zinc, nickel, and iron, among others, and waste streams from nuclear materials processing applications that contain technetium-99, chromium, and antimony. The U.S. Environmental Protection Agency classifies waste as hazardous, under the Resource Conservation and Recovery Act (RCRA), if excessive amounts of heavy metals leach from the waste during the Toxicity Characteristic Leaching Procedure (TCLP). Land disposal of leachable heavy metal waste is very expensive and strictly regulated, and therefore cost-effective, safe, leach resistant methods for encapsulating heavy metal waste is of current environmental importance.

Stabilization of low-level mixed waste requires that the contaminants, including soluble heavy metals ions, are effectively immobilized. No single solidification and stabilization technology is known to successfully treat and dispose of low-level mixed waste, due to the physical and chemical diversity of the waste streams. Conventional high-temperature waste treatment methods (e.g., incineration, vitrification) are largely unsuitable for the treatment of low-level mixed waste streams, because their reliance on high temperature risks the release of volatile contaminants and they generate undesirable secondary waste streams. A low-temperature approach is to stabilize hazardous waste by using inorganic (e.g., pozzolanic) binders, such as cement, lime, kiln dust, and/or fly ash. Disadvantages of this approach include a high sensitivity to the presence of impurities, high porosity, and low waste loading volume. Organic binders (e.g., thermosetting polymers) are used even less frequently, because of cost and greater complexity of application. Organic binders are not compatible with water-based wastes, unless the waste is first pre-treated and converted to an emulsion or solid, and organic binders are subject to deterioration from environmental factors, including biological action and exposure to ultraviolet light.

Recently, an alternative low-temperature approach has been developed at Argonne National Laboratory for stabilizing and solidifying low-level mixed waste by incorporating or loading the waste into a phosphate ceramic waste form. This technique immobilizes the waste by solidification, such that the waste is physically micro-encapsulated within the dense matrix of the phosphate ceramic waste form, and stabilizes the waste by converting the waste into their insoluble phosphate forms. Ceramic encapsulation systems are particularly attractive given that the bonds formed in these systems are ether ionic or covalent, and hence stronger than the hydration bonds in cement systems. Also, the ceramic formulation process is exothermic and economical.

Phosphates are particularly good candidates for stabilization of radioactive and hazardous waste, because phosphates of radio nuclides and hazardous metals are essentially insoluble in groundwater. A salient feature of the low-temperature ceramic phosphate formulation process is an acid-base reaction. For example, magnesium phosphate ceramic waste forms have been produced by reacting magnesium oxide (MgO) with phosphoric acid to form a phosphate of magnesium oxide, Newberyite, as represented in Equation (1), below.

$$MgO + H_3PO_4 + 2H_2O \rightarrow MgHPO_4 \cdot 3H_2O \qquad (1)$$

The acid-base reaction results in the reaction of the waste components with the acid or acid-phosphates, leading to chemical stabilization of the waste. In addition, encapsulation of the waste in the phosphate ceramic results in physical containment of the waste components. The reaction represented by Equation (1) above occurs rapidly and generates heat, and upon evaporation of the water, a porous ceramic product results.

U.S. Pat. No. 5,645,518 issued to Wagh, et al., incorporated herein by reference, describes in detail the process steps for setting liquid or solid waste in CBPC products using acid-base reactions. Accordingly, the process involves mixing ground solid waste, including salt waste spiked with heavy metals, with a starter powder of oxide and hydroxide powders of various elements; slowly adding the waste-powder mixture to an acid solution of phosphoric acid or soluble acid phosphates; thoroughly mixing the waste-powder-acid mixture for about a half hour to an hour at ambient temperatures (less than 100° C.), such that the components of the mixture chemically react to form stable phases and a reacted viscous slurry or paste results; and allowing the slurry or paste to set for a few hours into the final CBPC product. Liquid waste is similarly stabilized by mixing the liquid waste with the acid solution (preferably 50:50), and then reacting the waste-acid mixture with the starting powders. The maximum temperature for the process is about 80° C. The CBPC products attain full strength in about three weeks, and exhibit a complex structure, including a major crystalline phase, e.g., Newberyite ($MgHPO_4 \cdot 3H_2O$), and an insoluble, stable phase. The waste components are generally homogeneously distributed within the phosphate ceramic matrix. Unfortunately, however, the porous product (Newberyite) is unsuitable for waste treatment on a large scale.

U.S. Pat. No. 5,830,815 issued to Wagh, et al., incorporated herein by reference, describes improving the CBPC fabrication process by incorporating two temperature control processes for both reducing heat generation during the encapsulation (reaction) steps and moderating pH conditions (some wastes are unstable at a low pH). The first temperature control process involves pre-treating the phosphoric acid with a carbonate, bicarbonate or hydroxide of a monovalent metal (e.g., K, Na, Li, Rb) prior to mixing with an oxide or hydroxide powder so as to buffer the acid. In particular, potassium containing alkali compounds (e.g., $K_2O$, $KHCO_3$, KOH) result in a more crystalline waste form, and the higher the concentration of potassium in the potassium containing compound, the more crystalline the final product, resulting in a higher compression strength, lower porosity, and greater resistance to weathering, compressive forces, and leaching. The second temperature control process involves bypassing the use of the acid and mixing the oxide powder with dihydrogen phosphates of potassium, sodium, lithium, or other monovalent alkali metal, to form a ceramic at a higher pH.

Neutralizing the phosphoric acid solution in equation (1) by adding potassium hydroxide (KOH), as represented in the chemical equation (2) below, reduces the reaction rate and heat generation, and results in the formation of a superior magnesium potassium phosphate (MKP) mineral product, $MgKPO_4 \cdot 6H_2O$ (magnesium potassium phosphate hexahydrate), as represented in chemical equation (3) below.

$$H_3PO_4 + KOH \rightarrow KH_2PO_4 \cdot H_2O \quad (2)$$

$$MgO + KH_3PO_4 + 5H_2O \rightarrow MgKPO_4 \cdot 6H_2O \quad (3)$$

The chemically bonded ceramic phosphate (CBPC) waste form (e.g, $MgKPO_4 \cdot 6H_2O$) is a dense, hard material with excellent durability and a high resistance to fire, chemicals, humidity, and weather. The low-temperature (e.g., room-temperature) process encapsulates chloride and nitrate salts, along with hazardous metals, in magnesium potassium phosphate (MKP) ceramics, with salt waste loadings of up to between approximately 70 weight percent and approximately 80 weight percent. This durable MKP ceramic product has been extensively developed and used in U.S. Department of Energy waste treatment projects.

Phosphates in general are able to bind with hazardous metals in insoluble complexes over a relatively wide pH range and most metal hydroxides have a higher solubility than their corresponding phosphate forms. In addition to the magnesium and magnesium-potassium phosphate waste products discussed above, known waste encapsulating phosphate systems include, but not limited to, phosphates of magnesium-ammonium, magnesium-sodium, aluminum, calcium, iron, zinc, and zirconium (zirconium is preferred for cesium encapsulation). A non-exclusive summary of known phosphate systems and processing details is provided in Table I below, selected according to the ready availability of materials and low cost. It is also known to add other materials to either the waste or ceramic binder ingredients, such as fly ash.

TABLE I

Phosphate Systems and Processing Details

| System | Starting Materials | Solution | Curing Time |
|---|---|---|---|
| MKP | Ground MgO, ground K dihydrophosphate crystals | Water | 1 hour |
| Mg phosphate | Calcined MgO | Phosphoric acid-water (50/50) | >8 days |
| Mg-NH$_4$ phosphate | Crushed dibasic NH$_4$ phosphate crystals mixed with calcined MgO | Water | 21 days |
| Mg-Na phosphate | Crushed dibasic Na phosphate crystals mixed with calcined MgO | Water | 21 days |
| Al phosphate | Al(OH)$_3$ powder | Phosphoric acid (≈ 60° C.) | Reacted powder, pressed |
| Zr phosphate | Zr(OH)$_4$ | Phosphoric acid | 21 days |

Iron oxides including either iron oxide (FeO) itself or magnetite ($Fe_3O_4$) have also been used in the formation of phosphate ceramic products, however, these materials are uncommon and expensive. Haematite ($Fe_2O_3$) is a very unreactive powder and efforts to form a chemically bonded phosphate ceramic (CBPC) product using haematite have been unsuccessful. When mixed with phosphoric acid, and even highly concentrated phosphoric acid, the haematite either does not react or reacts at such a slow rate that the reaction is impractical for the development of CBPC products. The slow rate of reaction is due to the insolubility of haematite, which is in its highest oxidation state.

Appropriate oxide powders include, but are not limited to, oxides or hydroxides of aluminum, calcium, iron, magnesium, titanium, and zirconium, and combinations thereof. The oxide powders may be pre-treated (e.g., heated, calcined, washed) for better reactions with the acids. While no pressure is typically applied to the reacted paste, about 1,000 to 2,000 pounds per square inch may be applied when zirconium-based powders are used.

The acid component may be dilute or concentrated phosphoric acid or acid phosphate solutions, such as dibasic or tribasic sodium, potassium, or aluminum phosphates, and the paste-setting reactions are controllable either by the addition of boric acid to reduce the reaction rate, or by adding powder to the acid while concomitantly controlling the temperature. Examples of appropriate phosphates include phosphates of aluminum, beryllium, calcium, iron, lanthanum, magnesium, magnesium-sodium, magnesium-potassium, yttrium, zinc, and zirconium, and combinations thereof. Salt waste may be reacted with phosphoric acid to consume any carbon dioxide ($CO_2$) present, prior to mixing the salt waste with the oxide powders or binding powders, as the evolution of $CO_2$ results in very porous final ceramic products.

Unfortunately, the acid-base reactions involved in the phosphate ceramic systems described above occur very rapidly, resulting in the generation of considerable exothermic heat that prevents the formation of homogeneous large scale phosphate ceramic monoliths. The rapid setting of the CBPC products also hinders the proper conversion of hazardous or radioactive contaminants into stabilized phosphate forms. As a result, the CBPC products formed by methods known in the art have very poor density and strength.

Encapsulation of waste containing heavy metals in known CBPC systems is also of limited practical use. Although heavy metals in the form of soluble nitrates (e.g., $Cr(NO_3)_3 \cdot 9H_2O$, $Ni(NO_3)_2 \cdot 6H_2O$, $Pb(NO_3)_2$, and $Cd(NO_3)_2 \cdot 4H_2O$) are reportedly converted to insoluble phosphates by the CBPC forming chemical reactions, there is a critical need to improve their leach resistance and to provide greater stabilization for the metal anions of technetium-99, chromium, and antimony. Efforts to encapsulate heavy metal waste in phosphate ceramic products are further hampered by low maximum waste loading capacities, because of interference of the metal anions with ceramic-setting reactions, leaching of soluble metal anions from the resulting highly porous ceramic product (especially in aqueous environments), and rapid structural degradation of the ceramic product caused by the high leach rates. Also, environmental stresses degrade the integrity of known CBPC waste forms over time. For example, exposure to repeated cycles of wetting, drying and/or freezing, or acidic or other conditions conducive to leaching may affect the long term effectiveness of waste encapsulated CBPC waste forms.

A need exists for improved phosphate ceramic systems and improved methods for disposing of wastes containing metal anions in phosphate ceramic products.

The present invention is a surprisingly effective process step that significantly improves known phosphate ceramic formulations, enables the production of iron-based phosphate ceramic systems, and critically increases the stabilization of wastes containing heavy metals within CBPC composites. The invention involves adding oxidants or reductants to the ceramic phosphate formulations to retard or accelerate the acid-base reactions and thereby control the exothermic temperature of the reactions. In addition, the use of reducing agents significantly improves the stabilization of the metal anions within the phosphate ceramic composition, and thus the leach resistance of the encapsulated metals, by changing the valence of the metal to a lower oxidation state, such that the metal is more stable in the presence of the phosphate ions and/or the metal is more reactive with the phosphate ions.

Therefore, in view of the above, a basic object of the present invention is to control the reactions rates and heat generation in phosphate ceramic processes to allow homogeneous large scale phosphate ceramic monoliths.

Another object of the present invention is to significantly improve the density and strength of phosphate ceramic products formulated from methods known in the art.

Another object of the present invention is to form chemically bonded phosphate ceramic products from inexpensive iron-based materials, such as haematite.

Yet another object of the present invention is to provide an improved method for stabilizing waste containing metal anions in a phosphate ceramic composite having increased loading capacity and improved leach resistance.

A further object of the invention is to provide an improved, safe, low temperature, economical method for stabilizing large volumes of waste containing metal anions in a durable, long term storage phosphate ceramic product.

Additional objects, advantages, and novel features of the invention are set forth in the description below and/or will become apparent to those skilled in the art upon examination of the description below and/or by practice of the invention. The objects, advantages, and novel features of the invention may be realized and attained by means of instrumentation and combinations particularly pointed out in the appended claims.

BRIEF SUMMARY OF THE INVENTION

Briefly, this invention is a surprisingly effective method for significantly improving phosphate ceramic formulations and enabling the production of iron-based phosphate ceramic systems. The invention involves the addition of an oxidizing or reducing step to known phosphate ceramic formulations during the acid-base reactions between the oxide powders and phosphoric acid or acid phosphate solutions. The additives allow control of the rate of the acid-base reactions and concomitant heat generation. As a result, phosphate ceramic systems incorporating iron-based materials are practical, including the formation of iron phosphate ceramic products from haematite, a readily available, inexpensive material. The CBPC products may be crystalline ceramics and/or glass (non-crystalline).

In an alternate embodiment, the addition of reducing agents to the ceramic phosphate system significantly improves the stabilization of heavy metal waste encapsulated within chemically bonded phosphate ceramic (CBPC) waste forms. Addition of the reducing agent, preferably a stannous salt, changes the valence of the metal to a lower oxidation state, such that the metal is more stable in the presence of the phosphate ions and/or the metal is more reactive with the phosphate ions. Importantly, the reduced metal ions are more stable and/or more reactive with the phosphate ions, resulting in the formation of insoluble metal species within the final phosphate ceramic matrix.

BRIEF DESCRIPTION OF THE DRAWINGS

The appended claims set forth those novel features which characterize the invention, however, the invention itself, as well as further objects and advantages thereof, will best be understood with reference to the following detailed description of a preferred embodiment, in conjunction with the accompanying drawings, where like reference characters identify like elements throughout the various figures, in which:

DETAILED DESCRIPTION OF THE INVENTION

The present invention modifies known methods for encapsulating waste in chemically bonded phosphate ceramic (CBPC) products, described in detail in the Background Section above, by incorporating a new and unique oxidation or reducing step that controls the rate of the acid-base reaction in the formation of phosphate ceramic systems. The addition of the oxidation or reducing agent to the CBPC binder mix aids in controlling the rate of the acid-base reactions and, importantly, changes the oxidation state and/or reactivity of CBPC ingredients, e.g., starter oxide powders. Altering the oxidation state of the compound may allow CBPC compounds to become more reactive and encapsulated waste to become more reactive and less soluble.

Iron Phosphate Ceramic Products Formed from Haematite

As discussed above, haematite ($Fe_2O_3$), an inexpensive and very common ingredient in lateritic soils and several mineral wastes, including iron waste tailing and red mud, has not been successfully used to form a chemically bonded phosphate ceramic (CBPC) product, because of its high oxidation state, insolubility, and slow reaction rate with phosphoric acid. Using known CBPC formulations, the haematite remains unaltered in the oxidation environment of the phosphate solution during the acid-base reactions.

The present invention enables the formation of an iron phosphate ceramic product made from haematite by converting the haematite into a slightly lower oxidation state, thereby increasing its reactivity. For example, adding reductants, such as tin chloride or iron sulfide, during the acid-base reaction results in the conversion of $Fe_2O_3$ to $Fe_2O_{3-\delta}$. Preferably, the haematite is reduced prior to contacting the haematite with the acid phosphate solution. The reduction of haematite is alternatively accomplished by heating haematite powder in a reducing atmosphere that contains, but is not limited to, nitrogen, high carbon, low oxygen, carbon monoxide, and/or iron, or by calcining the haematite powder in a vacuum.

EXAMPLE 1

Figure 1:
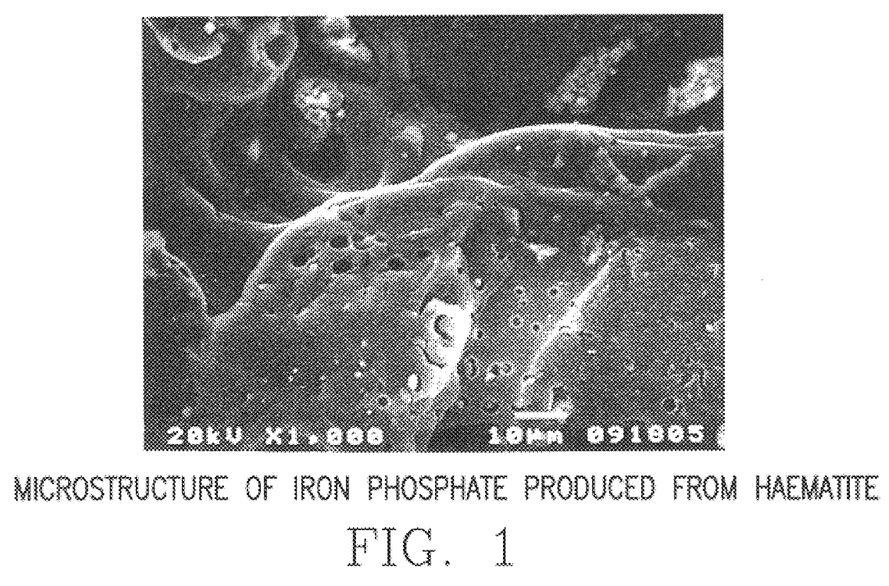
FIG. 1 shows an scanning electron microscopy (SEM) micrograph of an iron-based CBPC product made from haematite.

An iron-based chemically bonded phosphate ceramic product was formed using haematite and tin chloride as a reductant. First, 100 g of haematite having a particle size of between 10–50 $\mu$m was mixed with 5 wt % of tin chloride, in a powder form. The mixture was thoroughly stirred in 50 wt % dilute phosphoric acid solution, in a solution to powder ratio of 1:1, for 30 minutes, forming a thick, pourable paste. The paste hardened after 24 hours and was completely set after 3 weeks. The resulting iron-based CBPC product was dense with negligible porosity, and had the red color of haematite. The surface appeared very glassy, and upon fracturing, the fracture surfaces were smooth and glass-like with no visible pores. X-ray diffraction showed the iron-based CBPC product to be mainly glassy, and, therefore, the newly discovered iron-based CBPC product is identified as a glass-crystalline ceramic. FIG. 1 shows an SEM micrograph of the iron-based CBPC product made from haematite.

EXAMPLE 2

An iron-based chemically bonded phosphate ceramic product was formed using haematite and iron sulfide as a reductant. 100 g of haematite having a particle size of between 10–50 μm was mixed with 5 wt % of iron sulfide, in a powder form, and the mixture was thoroughly stirred in 60 wt % dilute phosphoric acid solution, in a solution to powder ratio of 1:1, for 30 minutes, forming a thick, pourable paste. The paste hardened after 24 hours and was completely set after 1 week. The resulting iron-based CBPC product was red in color, dense with negligible porosity, and was also identified as a glass-crystalline ceramic.

In an alternate embodiment, the rate of reaction in the formation of iron phosphate ceramics from iron oxide or magnetite is retarded by the addition of boric acid. It is known to control paste-setting reactions by the addition of boric acid.

EXAMPLE 3

Figure 2:
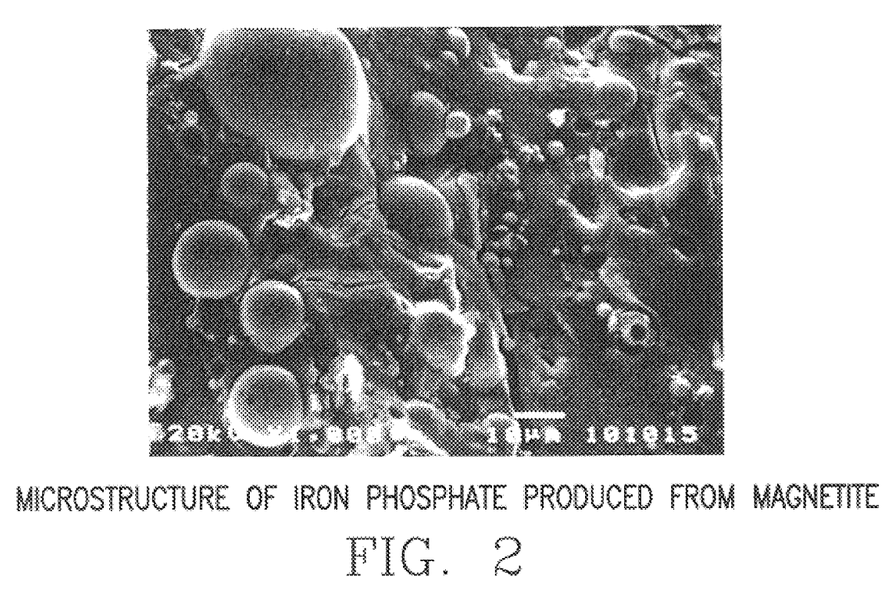
FIG. 2 shows an SEM micrograph of an iron-based CBPC product made from magnetite.

An iron-based chemically bonded phosphate ceramic product was formed from magnetite. First, 100 g of magnetite having a particles size of between 10–50 μm was mixed with 10 wt % of boric acid (retardant). The resultant mixture was thoroughly stirred in 40 to 50 wt % dilute phosphoric acid solution in a 1:1 ratio of solution to powder for 30 minutes, forming a thick, pourable paste. The paste hardened after 1 hour and was completely set in 24 hours. The iron-based CBPC product had a black color, and was dense with negligible porosity. X-ray diffraction indicated the existence of glassy and crystalline phases. FIG. 2 shows an SEM micrograph of the iron-based CBPC product made from magnetite. A similar material was also made using 50 wt % class F fly ash in the binder powder. Analysis of the iron-based CBPC products made from magnetite indicated that a considerable amount of unreacted magnetite remained in the CBPC product.

In another embodiment, the reaction rate of the acid-base reaction in the formation of an iron-based CBPC product made from magnetite was controlled by adjusting the concentration of the phosphoric acid solution and the pH. Although it is known to use phosphoric acid ($H_3PO_4$) having a concentration of 50 wt %, magnetite or FeO may be reacted with a dilute $H_3PO_4$ solution that is between about 30 and about 40 wt %. The $H_3PO_4$ solution may also be partially neutralized using oxides, hydroxides, carbonates, or anhydrous phosphates prior to the acid-base reaction with FeO or $Fe_3O_4$ to reduce the rate of the reactions for forming the iron-based CBPC products.

EXAMPLE 4

An iron-based chemically bonded phosphate ceramic product was formed from magnetite and a pH adjusted phosphoric acid. 50 wt % concentrated phosphoric acid was mixed with 5 to 15 wt % potassium carbonate ($K_2CO_3$). 100 g of magnetite having a particle size of between 10–50 μm was thoroughly stirred in the pH adjusted phosphoric acid solution, in a ratio of powder to solution of 1:2, forming a thick, pourable paste. The paste hardened after 1 hour and was completely set in 24 hours. The iron-based CBPC product had a black color, and was dense with negligible porosity. X-ray diffraction indicated the existence of glassy and crystalline phases. A similar material was also made using 50 wt % class F fly ash in the binder powder. Analysis of the iron-based CBPC products made from magnetite indicated that a considerable amount of unreacted magnetite remained in the CBPC product.

Stabilization of Metal Anions

In this embodiment, radioactive and/or hazardous waste materials containing metal anions are stabilized in CBPC products by the addition of a reducing agent to the waste and/or phosphate ceramic ingredients. The waste is generally waste containing nitrates, chlorides, sulfates, silicates, salts, heavy metals, any type of inorganic waste, and/or combinations thereof. Addition of the reducing agent to the metal anions, oxide or hydroxide powders, and/or phosphoric acid or soluble acid phosphates reduces the valency of the metal anions to a lower oxidation state during formation of the CBPC product. Incorporation of the reducing agent into CBPC formulations solves the problems experienced in the art due to the presence of metal anions in the waste stream by stabilizing the metal anions within the CBPC product in an insoluble form.

The reducing agent is preferably selected from a group including, but is not limited to, sodium monosulfide ($Na_2S$), potassium monosulfide ($K_2S$), calcium sulfide (CaS), iron sulfide (FeS), iron sulfate ($FeSO_4.7H_2O$), sodium thiosulfate ($Na_2S_2O_5$), sulfur dioxide ($SO_2$), sodium borohydride ($NaBH_4$), hydrazine, sodium bisulfite ($NaHSO_3$), calcium hydroxide ($Ca(OH)_2$), sodium hydroxide (NaOH), sodium carbonate ($Na_2CO_3$), sulfuric acid ($H_2SO_4$), and formic acid (HCOOH), among others. Preferably, the reducing agent is a stannous salt, such as tin chloride ($SnCl_2$). Table II below provides a summary of preferred reducing agents depending upon the content of the metal waste. More than one reducing agent may be used where the waste is known to contain various metal contaminants.

TABLE 11

Appropriate Reducing Agents for Heavy Metal Waste

| Metal Waste | Reducing Agent |
|---|---|
| Arsenic | $SnCl_2$ |
| Chromate | $SnCl_2$, $Na_2S$ |
| Mercury | $Na_2S$ |
| Selenium | $SnCl_2$ |
| Technetium | $SnCl_2$ |

The reducing agent may be added to the heavy metal waste, starter powder, and/or acid solution, in any combination. Preferably, the reducing agent is initially added to the heavy metal waste, resulting in the precipitation of the hazardous metals, and subsequently mixed with the CBPC powder and acid solution. The addition of the reducing agent to the waste and/or ceramic binder ingredients is largely dependent upon the type of reducing agent and its reactivity with the phosphates. For example, if a reducing agent is very strong, it is preferably to add the reducing agent to the waste-ceramic slurry early in the mixing step. In general, two to three times more than the stoichiometric amount of the reducing agent is used, depending on the amount of metal present in the waste. The addition of the reducing agent results in reduction of the metal anions to their lower oxidation states, and in some cases to cations, such that the reduced metal ions are more stable and/or more readily react with the phosphate ions to form insoluble metal species, including oxides and hydroxides of the metals.

EXAMPLE 5

In this non-limiting example, the stabilization of chromium anions was improved in magnesium potassium phosphate (MKP) ceramics by incorporating waste containing chromate ($Cr_2O_7^{2-}$) into an MKP binder powder including a tin chloride ($SnCl_2$) reducing agent. Addition of the reducing agent results in the reduction of the valency of the chromium anions from +6 to +3, thus decreasing the leachability of the chromate from the MKP ceramic product. In addition, the reduction of the chromate may increase the reactivity of the chromium ions with the phosphate ions in the acid solution, promoting the formation of insoluble chromium phosphate.

MKP ceramic composites loaded with 58 wt % and 70 wt % nitrate waste were fabricated by incorporating nitrate waste containing chromium into MKP binder materials, both with and without the presence of a tin chloride reducing agent.

The 58 wt % waste loaded MKP ceramic product was fabricated by first adding 50 g of the waste to 0.17 g of the reducing agent sodium monosulfide ($Na_2S$) and 12 g of water. About 0.5 g of boric acid may also be added as a retarder. Next, 0.86 g of a second reducing agent, tin chloride ($SnCl_2$), was added to the waste slurry and mixed for 5 minutes. Fractions of the ceramic binder ingredients, including 4.67 g of water and a mixture of 7.69 g of magnesium oxide (MgO) and 25.64 g of potassium dihydrogen phosphate ($K_2HPO_4$), were then added to the waste slurry in 5 minute intervals.

The 70 wt % loaded MKP ceramic waste product was fabricated by the same steps, except the amounts of ceramic binder ingredients used were 12 g water, 4.95 g MgO, and 16.48 g $KH_2PO_4$.

Table III below provides the results of the Toxicity Characteristic Leaching Procedure (TCLP) applied to the fabricated MKP ceramic products. The results show dramatic improvements in leach resistance in MKP ceramic products fabricated in accordance with the present invention. Without the reducing agent, the MKP ceramic product failed the leaching test, while addition of the reducing agent produced an MKP ceramic product that is well below allowable EPA regulatory limits. Thus, addition of the $SnCl_2$ reducing agent was critical to the successful stabilization and containment of the chromium.

TABLE III

Phosphate Systems and Processing Details

| CBPC Product Fabricated | | | | |
|---|---|---|---|---|
| Nitrate | | | Leach Resistance | |
| Waste Loading (wt %) | Chromium Concentration (ppm) | Addition of $SnCl_2$ | EPA Regulatory Limit (ppm) | TCLP Results (ppm) |
| 58 | 300 | NO | 0.86 | 10.3 |
| 58 | 300 | YES | 0.86 | 0.02 |

TABLE III-continued

Phosphate Systems and Processing Details

| CBPC Product Fabricated | | | | |
|---|---|---|---|---|
| Nitrate | | | Leach Resistance | |
| Waste Loading (wt %) | Chromium Concentration (ppm) | Addition of $SnCl_2$ | EPA Regulatory Limit (ppm) | TCLP Results (ppm) |
| 70 | 360 | NO | 0.86 | 16.3 |
| 70 | 610 | YES | 0.86 | 0.04 |

EXAMPLE 6

Technetium-99 ($^{99}Tc$) is present in some high-level wastes (HLW), in addition to other volatile fission products, including cesium-137 ($^{137}Cs$) and strontium-90 ($^{90}Sr$). Under oxygen-containing conditions, the predominant form of technetium is the pertechnetate anion, $TcO_4^-$, which is highly soluble in water and readily mobile in the environment. Immobilization of technetium-99 is of critical concern, because of its high leachability and long half life (e.g., $2.13 \times 10^5$ years). Technetium-99 was successfully stabilized in the MKP ceramic product, in accordance with the present invention, in that the addition of stannous chloride reduced the oxidation state of technetium-99 from +7 to +4. The waste solution used in this example was a stripping solution generated by a complexation and elution process developed at the Los Alamos National Laboratory (LANL) to separate technetium-99 from HLW, and contained approximately 20 ppm to 150 ppm of technetium-99.

In a first approach, eluted aqueous waste was directly stabilized, such that the water in the waste was used in the CBPC fabrication process. CBPC products were fabricated with and without the addition of the reducing agent, tin chloride ($SnCl_2$). MKP ceramic products were formed from 19.973 g of LANL stripping solution containing about 40 ppm $^{99}Tc$ by adding the stripping solution to a binder mixture including 2.48 g $SiO_2$, 8.38 g of MgO, and 28.28 g of $KH_2PO_4$, and mixing the mixture for 20 minutes, resulting in a fine slurry. The reducing agent, 1.16 g of tin chloride ($SnCl_2$) was added to the mixtures after 18 minutes of mixing. No water was added during the process. MKP ceramic products were similarly formed, by the same process, from 1.712 g of LANL stripping solution that did not contain any $^{99}Tc$.

The resulting fine slurries were transferred into molds, and allowed to set. The typical temperature rise during setting was between about 55° C. to about 70° C. The slurries hardened into a dense monolithic MKP ceramic products in about 2 hours. After at least 14 days of curing, the resulting MKP ceramic products fabricated directly from the LANL elution solution had a density of 1.8 g/cm$^3$, a very low open porosity of 4%, and a compression strength of 30±6.7 MPa, a compression strength significantly higher than the land disposal compression strength requirement of 3.4 MPa, demonstrating the MKP ceramic product's superior dense, hard, high-strength structure. The MKP ceramic products were tested for strength, leaching, and water immersion, evidencing that the addition of the reducing agents helped to maintain the $^{99}Tc$ in its relatively insoluble cationic form, $Tc^{+4}$. The optimal loading of the elution solution in the MKP ceramic product was 35%, and the concentrations of the $^{99}Tc$ in the MKP ceramic products were in the range of between about 20 to about 150 ppm.

Figure 3:
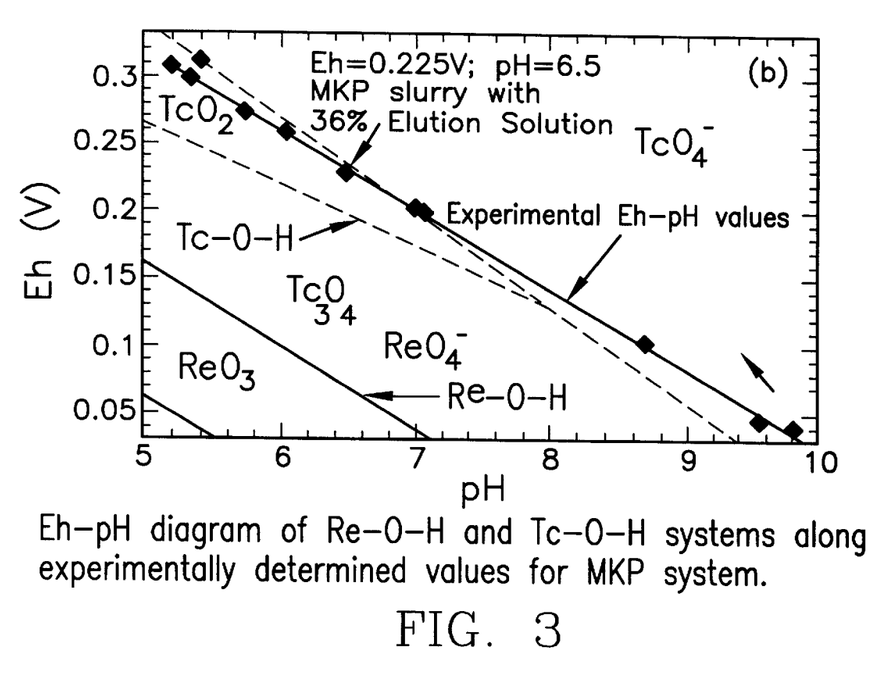
FIG. 3 graphically illustrates Eh-pH values for magnesium potassium phosphate (MKP) ceramic products fabricated by the present improved method.

The leachability of $^{99}$Tc is highly dependent upon its oxidation state, and, therefore, it is important to establish redox conditions in the phosphate slurry during fabrication of the MKP ceramic product. FIG. 1 is a graphical illustration of an Eh/pH diagram for both a Re—O—H and a Tc—O—H system in the pH range of 5 to 10. Also shown are experimentally determined Eh values as a function of pH for the MKP slurries containing eluted waste, measured at various elution solution loadings, wherein rhenium was added to the elution solution as a substitute for $^{99}$Tc. For example, FIG. 3 shows that the Eh and pH values of the slurry with 36% $^{99}$Tc elution solution loading under the normal setting conditions are +225 mV and 6.5, respectively. In the pH range of 5 to 10 pH, Eh values of Re are in the highly soluble heptavalent oxidation state. For a pH of less than 7, Eh values of $^{99}$Tc are in the insoluble $TcO_2(Tc^{+4})$ oxidation state, while for a pH of greater than 7, $^{99}$Tc is present as $TcO_4^-(Tc^{+7})$. The MKP slurry and setting conditions prescribed by the present invention (e.g., 36% loading, 6 to 7 pH, Eh +225 mV) are highly conducive to maintaining $^{99}$Tc in the insoluble +4 oxidation state. Importantly, the addition of a reducing agent to the slurry critically aids in the reduction of $TcO_4^-(Tc^{+7})$ to its stable and insoluble +4 oxidation state.

In a second approach, technetium-99 was precipitated from the eluted solution by heating in the presence of zinc and 4 M hydrochloric acid, and the precipitated technetium-99 ($TcO_2 \cdot 2H_2O$) was incorporated into the MKP ceramic product. The loadings of the technetium-99 in the MKP ceramic products were as high as 900 ppm. Since it is well known that $TcO_2 \cdot 2H_2O$ is highly insoluble, with a solubility of $10^{-7}$ to $10^{-8}$ mol/L in water under mildly reducing conditions, precipitation of the technetium-99 as the highly insoluble $TcO_2 \cdot 2H_2O$, followed by encapsulation in the MKP matrix, yields a superior, stabilized phosphate ceramic product, with a higher loading than that accomplished by the direct elution method of the first approach.

Technetium-99 is generally precipitated from LANL stripping solutions by adding zinc to the LANL stripping solution, adding HCl to the mixture, and boiling the mixture at about 70° C. for about 45 minutes. This process results in the precipitation of $TcO_2 \cdot 2H_2O$ with about a 40% recovery of $^{99}$Tc.

Table IV below provides results of diffusivity and leachability testing of the MKP ceramic products loaded with $^{99}$Tc, fabricated with and without the reducing agent step. These results demonstrate that the MKP ceramic products fabricated with the addition of the reducing agent ($SnCl_2$) provide significantly improved retention of contaminants within the MKP matrix.

TABLE IV

ANS 16.1 Results for MKP Ceramic Products Containing $^{99}$Tc

| CBPC Product Fabricated | Test Results | | |
|---|---|---|---|
| Composition | $^{99}$Tc Concentration (ppm) | Effective Diffusivity (cm$^2$/s) | Leachability Index |
| MKP + Eluted Waste | 20 | 1.20E-09 | 8.92 |
| MKP + Eluted Waste | 40 | 2.95E-09 | 8.53 |
| MKP + SnCl$_2$ + Eluted Waste | 20 | 2.9E-12 | 11.54 |
| MKP + SnCl$_2$ + Eluted Waste | 40 | 5.4E-12 | 11.27 |
| MKP + SnCl$_2$ + Eluted Waste | 124 | 3.8E-15 | 14.42 |
| MKP + SnCl$_2$ + Precipitated $^{99}$Tc | 41 | 2.2E-14 | 14.6 |
| MKP + SnCl$_2$ + Precipitated $^{99}$Tc | 16 4 | 2.3E-13 | 13.3 |
| MKP + SnCl$_2$ + Precipitated $^{99}$Tc | 903 | 7.2E-15 | 14.6 |

* The Nuclear Regulatory Commission (NRC) requires a leachability index of at least 6.0.

Table V below provides results of Product Consistency Test (PCT) conducted on the MKP ceramics fabricated according to the second, precipitation approach. Normalized leaching rates of $^{99}$Tc, after a 7-day test period at room temperatures, e.g., 25° C., were reported as low as 1×10−3 g/m$^2$–d. At an elevated temperature, e.g., 90° C., the dissolution rate of the matrix increases, and, therefore, the normalized leaching rate for $^{99}$Tc also increased to the $10^{-2}$ to $10^{-1}$ g/m$^2$–d range. Significantly, for both the room temperature and elevated temperature testes, the MKP ceramics with the highest $^{99}$Tc loadings demonstrated the lowest normalized leaching rate. The PCT test was initially designed to evaluate chemical durability of crushed borosilicate glass. A comparison between PCT test results at 90° C. for high-temperature encapsulation of $^{99}$Tc in borosilicate glass, resulting in a leach rate as low as $10^{-2}$ g/m$^2$–d, versus the low-temperature encapsulation of $^{99}$Tc within MKP ceramics stabilized with a reducing agent, as reported in Table IV, show that the present invented low-temperature encapsulation is a viable and competitive approach.

TABLE V

PCT Results for MKP Ceramic Products Containing $^{99}$Tc

| Composition | Test Temperature (° C.) | $^{99}$Tc Concentration (ppm) | Normalized Leaching Rate (g/m$^2$-d) |
|---|---|---|---|
| MKP + SnCl$_2$ + Precipitated $^{99}$Tc | 25 | 40 | 3.9E-3 |
| MKP + SnCl$_2$ + Precipitated $^{99}$Tc | 25 | 164 | 8.5E-3 |
| MKP + SnCl$_2$ + Precipitated $^{99}$Tc | 25 | 903 | 1.1E-3 |
| MKP + SnCl$_2$ + Precipitated $^{99}$Tc | 90 | 40 | 7.2E-2 |
| MKP + SnCl$_2$ + Precipitated $^{99}$Tc | 90 | 164 | 1.1E-1 |
| MKP + SnCl$_2$ + Precipitated $^{99}$Tc | 90 | 903 | 3.6E-2 |

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

The embodiments of the invention in which an exclusive property or privilege is claimed are defined as follows:

1. A method for producing phosphate ceramic products, comprising the steps of:

contacting a starter oxide with a phosphate-containing solution to create phosphates of the oxide in a slurry;

adding at least one reducing agent to the slurry;

mixing the slurry; and allowing the slurry to set into a phosphate ceramic product.

2. The method according to claim 1, wherein the step of adding the reducing agent includes adding the reducing agent to the starter oxide prior to contacting the starter oxide with the phosphate containing solution.

3. The method according to claim 1, wherein the reducing agent is a stannous salt.

4. The method according to claim 1, wherein the reducing agent is tin chloride.

5. The method according to claim 1, wherein the reducing agent is selected from the group consisting of sodium monosulfide, potassium monosulfide, calcium sulfide, iron sulfide, iron sulfate, sodium thiosulfate, sulfur dioxide, sodium borohydride, hydrazine, sodium bisulfite, calcium hydroxide, sodium hydroxide, sodium carbonate, sulfuric acid, and formic acid.

6. The method according to claim 1, further comprising the step of first heating the starter oxide in a reducing atmosphere.

7. The method according to claim 1, further comprising the step of first calcining the starter oxide in a vacuum.

8. The method according to claim 1, wherein the starter oxide is haematite.

9. The method according to claim 1, wherein the starter oxide is an oxide or hydroxide of an element or compound selected from the group consisting of aluminum, calcium, iron, magnesium, titanium, and zirconium, and combinations thereof.

10. The method according to claim 1, wherein the phosphate-containing solution is comprised of a solution selected from the group consisting of phosphoric acid and acid phosphate, and further comprises an acid phosphate of a compound selected from the group consisting of aluminum, ammonium, beryllium, calcium, iron, lanthanum, magnesium, magnesium-sodium, magnesium-potassium, sodium, yttrium, zinc, and zirconium, and combinations thereof.

11. The method according to claim 1, wherein the phosphate-containing solution is phosphoric acid having a concentration in the range of between about 30 and about 50 weight percent and wherein the starter oxide is haematite.

12. The method according to claim 1, wherein the phosphate-containing solution is a diluted phosphoric acid having a concentration in the range of between about 30 and about 40 weight percent, and wherein the starter oxide is selected from the group consisting of magnetite or iron oxide.

13. The method according to claim 1, further comprising the step of partially neutralizing the phosphate-containing solution prior to the step of contacting the starter oxide with the phosphate-containing solution, thereby decreasing the rate of reaction.

14. The method according to claim 1, further comprising the step of adding boric acid to the slurry to control the rate of reaction.

15. The method according to claim 1, further comprising the step of adding a waste material to the slurry, such that the waste material is encapsulated by the phosphate ceramic product.

16. The method according to claim 1, wherein the phosphate ceramic product is a glass-crystalline ceramic.

17. The phosphate ceramic product produced by the method of claim 1.

18. A method for stabilizing waste containing at least one metal anion, in a phosphate ceramic product, comprising the steps of:

combining the waste with a starter oxide to obtain a powder;

contacting the waste and powder mixture with a phosphate-containing solution to create phosphates of the oxide in a slurry;

adding at least one reducing agent, such that the oxidation state of the metal anion is reduced;

mixing the slurry; and allowing the slurry to set into a phosphate ceramic product, thereby chemically and physically encapsulating the waste.

19. The method according to claim 18, wherein the step of adding the reducing agent includes adding the reducing agent to the waste prior to combining the waste with the starter oxide powder.

20. The method according to claim 18, wherein the step of adding the reducing agent includes adding the reducing agent to the waste and powder mixture prior to contacting the waste and powder mixture with the phosphate-containing solution.

21. The method according to claim 18, wherein the step of adding the reducing agent includes adding the reducing agent to the slurry.

22. The method according to claim 18, wherein the reducing agent is a stannous salt.

23. The method according to claim 18, wherein the reducing agent is tin chloride.

24. The method according to claim 18, wherein the reducing agent is selected from the group consisting of sodium monosulfide, potassium monosulfide, calcium sulfide, iron sulfide, iron sulfate, sodium thiosulfate, sulfur dioxide, sodium borohydride, hydrazine, sodium bisulfite, calcium hydroxide, sodium hydroxide, sodium carbonate, sulfuric acid, and formic acid.

25. The method according to claim 18, wherein the starter oxide is an oxide or hydroxide of an element or compound selected from the group consisting of aluminum, calcium, iron, magnesium, titanium, and zirconium, and combinations thereof.

26. The method according to claim 18, wherein the phosphate-containing solution is comprised of a solution selected from the group consisting of phosphoric acid and acid phosphate, and further comprises an acid phosphate of a compound selected from the group consisting of aluminum, ammonium, beryllium, calcium, iron, lanthanum, magnesium, magnesium-sodium, magnesium-potassium, sodium, yttrium, zinc, and zirconium, and combinations thereof.

27. The method according to claim 18, wherein the metal anion is an anion of a metal selected from the group consisting of antimony, arsenic, chromium, mercury, selenium, and technetium.

28. The method according to claim 18, wherein the metal is chromium and the reducing agent is selected from the group consisting of tin chloride and sodium monosulfide.

29. The method according to claim 18, wherein the metal is selected from the group consisting of arsenic, selenium, and technetium and the reducing agent is tin chloride.

30. The method according to claim 18, wherein the metal is mercury and the reducing agent is sodium monosulfide.

31. The method according to claim 18, wherein the metal anion is chromate and the step of adding a reducing agent to the slurry reduces the valency of chromate from +6 to +4.

32. The method according to claim 18, wherein the metal anion is technetium-99 and the step of adding a reducing agent to the slurry reduces the valency of technetium-99 from +7 to +4.

33. The method according to claim 18, wherein the metal anion is technetium-99 and the pH of the slurry is maintained at no greater than 7.

* * * * *